United States Patent [19]

Murray

[11] 4,302,879

[45] Dec. 1, 1981

[54] SAFETY BRAKING APPARATUS FOR PORTABLE CHAIN SAW

[75] Inventor: Billy W. Murray, Shreveport, La.

[73] Assignee: Beaird-Poulan Division Emerson Electric Co., Shreveport, La.

[21] Appl. No.: 102,014

[22] Filed: Dec. 10, 1979

Related U.S. Application Data

[62] Division of Ser. No. 942,987, Sep. 18, 1978, Pat. No. 4,197,640.

[51] Int. Cl.³ .............................................. B27B 17/00
[52] U.S. Cl. ...................................................... 30/382
[58] Field of Search ................. 30/381, 382, 383, 384, 30/385, 386, 387

[56] References Cited

U.S. PATENT DOCUMENTS

| | | | |
|---|---|---|---|
| 2,488,343 | 11/1949 | Standal | 30/387 |
| 2,638,944 | 5/1953 | Woleslagle | 30/382 X |
| 3,194,284 | 7/1965 | Walker | 30/386 |
| 3,276,490 | 10/1966 | Johansson | 30/383 X |
| 3,636,996 | 1/1972 | Lanz | 30/381 |
| 4,197,640 | 4/1980 | Murray | 30/382 |

*Primary Examiner*—Jimmy C. Peters
*Attorney, Agent, or Firm*—Hubbard, Thurman, Turner, Tucker & Glaser

[57] ABSTRACT

A chain saw having an improved safety brake actuating mechanism is provided. The actuating mechanism includes a safety lever pivotally mounted on the chain saw housing for movement from an operating position to a braking position in which a brake band is brought into frictional engagement with motive means which drives a cutting chain. A latching member is pivotally mounted on the safety lever for releasable latching engagement with the housing. A spring member engaged intermediate the housing and the latching member exerts a yieldable force on the safety lever which constantly biases the safety lever for movement from the operating position to the braking position while also exerting a yielding latching force on the latching member. The spring member cooperates with the safety lever for holding the latching member in releasable latching engagement with the housing and for resisting movement of the safety lever thereby preventing inadvertent frictional engagement of the brake band with the motive means when the lever is in the operating position. The spring member is cooperatively engaged with the safety lever for permitting rotation and disengagement of the latching member from the housing as the safety lever rotates from the operating position to the braking position in response to an actuating force acting on the safety lever.

2 Claims, 10 Drawing Figures

SAFETY BRAKING APPARATUS FOR PORTABLE CHAIN SAW

This is a division of application Ser. No. 942,987 filed Sept. 18, 1978, now U.S. Pat. No. 4,197,640 issued Apr. 15, 1980.

BACKGROUND OF THE INVENTION

1. Field of the Invention

The present invention relates to portable chain saw equipment and in particlar relates to an improved chain saw brake control and actuating mechanism for maintaining the brake in disengaged condition during normal operation and for automatically engaging the brake to protect the operator from the cutting chain in the event of contact between the operator and the safety lever which may occur as a result of "kickback".

2. Description of the Prior Art

A manually operated, portable chain saw commonly includes an engine carrying housing, a guide bar projecting forwardly from the housing and an engine driven cutter chain mounted on the guide bar for continuous movement. Proper operation of the chain saw requires that an operator grasp the machine with both hands, one hand holding a gripping handle mounted on the housing, and the other hand engaging a housing control handle for actuating a trigger throttle mechanism.

A well known safety problem in the use of a manually operated portable chain saw of this type is the occurrence of "kickback". Kickback is characterized by a violent movement of the saw which may occur when the nose of the guide bar and cutting chain contacts a solid object. The cutting chain of the saw tends to bite into the solid object with a force proportional to the speed of the chain. At the same time, there is a corresponding reaction force exerted on the saw by the object. If the momentum of the chain and other moving parts of the saw carries the chain into the object, then the energy of the chain is expended in the cutting action and the reaction force on the saw is greatly reduced. However, at lower chain speeds, the momentum may not be sufficient to sustain the cutting action, and the chain may become seized within the object. If the chain is not carried on through the cut, the saw is suddenly subjected to a full reactive force. When this force is exerted at the middle or on the upper quadrant of the nose of the guide bar and cutting chain, the nose moves suddenly upward in rotation generally about the rear of the saw.

Because of the way that a chain saw is held, the kickback motion is extremely difficult for an operator to control; thus there is considerable risk that he will be hit by the moving chain. If the saw is being held horizontally at the time of the kickback, then its motion will be somewhat opposed by the weight of the saw. This opposition decreases substantially as the saw is held more nearly vertically. For this reason, perhaps the most dangerous kickback situation is when the saw is being used to cut overhanging limbs or other such objects. There may be additional lack of control in this situation if the operator's arms are extended to reach the object above.

A number of safety brakes have been developed for quickly stopping the chain when kickback occurs. Although these safety brakes and their actuating mechanisms represent significant advancements, room for further improvement in the art remains. For example, there is a continuing interest in reducing the reaction time of the actuating and braking mechanism, and in reducing the number and size of the mechanical components required for carrying out the actuating and braking mechanism in order to minimize the weight and size of the manually portable chain saw.

Therefore, it is an important object of the invention to provide a chain saw actuating and braking apparatus which is capable of imposing sufficient braking forces to stop the cutter chain in less time than it takes a violent kickback reaction to occur.

It is another object of the invention to provide a chain saw braking mechanism which operates reliably, effectively and only in response to positive actuation of a safety lever.

It is yet another object of the invention to provide a chain saw brake actuating mechanism which involves a minimal number of parts that are capable of compact arrangement.

SUMMARY OF THE INVENTION

The foregoing objects and advantages are achieved by the present invention in which a manually operated portable chain saw includes a housing, a guide bar projecting from the housing, a cutting chain mounted around the guide bar and motive means carried by the housing and coupled to the chain for propelling the cutting chain around the guide bar. The safety braking mechanism includes a safety lever pivotally mounted on the housing for movement from an operating position to a braking position and a brake band having a first end portion coupled to the safety lever and a second end portion coupled to the housing with an intermediate portion disposed for frictional engagement with the motive means in response to movement of the safety lever from the operating position to the braking position. A latching member is pivotally mounted on the safety lever for rotational movement relative to the safety lever. The latching member includes a first end portion for engaging the safety lever and a second end portion disposed for releasable latching engagement with the housing. According to an important feature of the invention, a spring member is engaged intermediate the housing and the latching member and exerts a yieldable force on the safety lever through the latching member which constantly biases the safety lever for movement from the operating position to the braking position, and which also exerts a yieldable latching force on the latching member and cooperates with the safety lever for holding the latching member in releasable latching engagement with the housing for resisting movement of the safety lever, thereby preventing inadvertent frictional engagement of the brake band with the motive means when the safety lever is in the operating position. The spring member also cooperates with the safety lever for permitting rotation and disengagement of the latching member from the housing as the safety lever rotates from the operating position to the braking position in response to an actuating force acting on the safety lever.

In one preferred embodiment, the spring member comprises a lineally acting coil spring which is compressively seated intermediate the housing and latching member. In a preferred arrangement of this embodiment, the end of the brake band which is coupled to the safety lever projects through and is enclosed by the lineally acting coil spring. Also according to this arrangement, the end of the brake band is bifurcated thereby defining a central passage for receiving the portion of the latching member which engages the safety lever.

In yet another preferred embodiment, the spring member comprises a torsion spring coupled under a torsion load intermediate the latching member and the housing. In this arrangement, it is preferred that the torsion spring be mounted in coaxial relation with the pivotal axis of the safety lever.

The foregoing and other objects, advantages and features of the invention will hereinafter appear, and for purposes of illustration, but not of limitation, an exemplary embodiment of the subject invention is shown in the appended drawing.

DETAILED DESCRIPTION OF THE PREFERRED EMBODIMENTS

Figure 1:
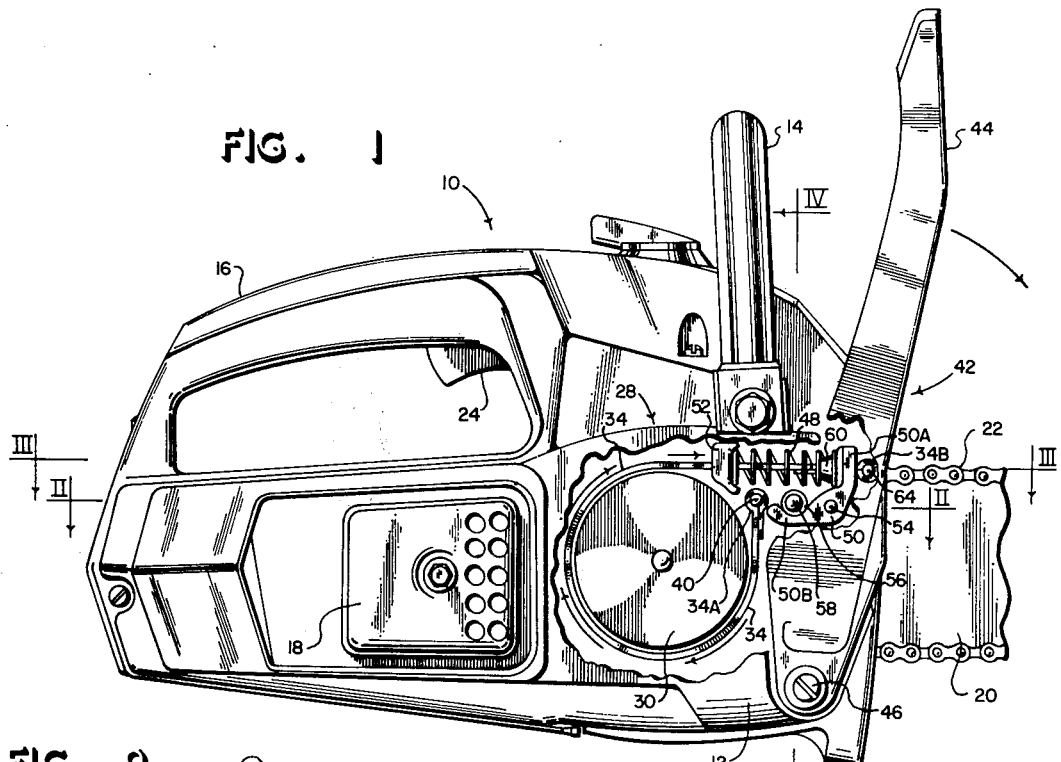
FIG. 1 is a side elevation view of a portion of a chain saw constructed according to the present invention.

In the description which follows, like parts are marked throughout the specification and drawing with the same reference numerals, respectively.

Figure 5:
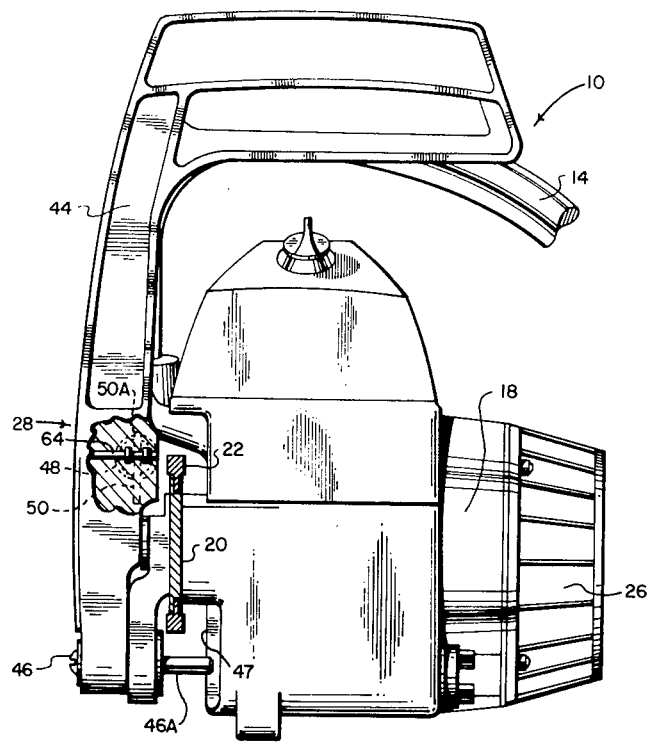
FIG. 5 is a front elevation view, partly in section, of the chain saw shown in FIG. 1.

Referring now to FIG. 1 of the drawing, a manually operated, portable chain saw 10 includes a frame or housing 12 having a forward handle bar 14 and a rearward handle 16. Carried by the housing 12 is an internal combustion engine 18 and a guide bar 20. Power transmission means including a centrifugal clutch, a crank shaft and a chain sprocket (not shown) are coupled to the internal combustion engine 18. Trained around the chain sprocket and guided by the guide bar 20 is a cutting chain 22. Forming a part of the engine 18 is a carburetor (not shown) which includes a throttle (not shown) controlled by a linkage connected to a throttle controlling trigger 24 which is pivotally mounted on the rear handle 16. A rewind starter assembly 26 is accessible on one side of the housing 12 (FIG. 5), and a chain brake assembly 28, described in further detail below, is located on the opposite side. The above components are all well known in the art.

According to the invention, the chain brake assembly 28 includes a clutch drum 30 which is driven by the internal combustion engine as it drives the cutting chain 22. Typically, the clutch drum 30 is mechanically coupled to a shaft 32 on which the sprocket wheel which drives the cutting chain 22 rotates. In other constructions, the clutch drum 30 rotates with an intermediate driven member of a clutch assembly which drives the cutting chain 22. The braking action is obtained by the frictional engagement of a flexible brake band 34 with the clutch drum 30. As can best be seen in FIGS. 1 and 6, the brake band 34 encircles the outer periphery of the clutch drum 30. During normal operation, that is during the usual cutting operation, the brake band 34 is loosely coupled about the clutch drum 30 with a small gap 36 (FIG. 6) separating the brake band from frictional contact with the clutch drum 30. One end 34A of the brake band is looped and fastened about a pin 40 which is anchored to the housing 12. As the opposite end of the brake band is displaced forwardly relative to the housing, the brake band 34 becomes tightened in frictional engagement with the clutch drum 30 thereby causing the clutch drum to cease rotating and thus indirectly stopping the motion of the cutting chain 22.

In operation, the chain saw 10 is held by an operator using one hand to grasp the handle 14 and the other hand to engage the rear control handle 16. Cutting manipulation of the saw 10 is typically achieved by utilizing the control handle 16 as a fulcrum and applying guiding pressure to the forward handle 14. It will be appreciated that a potential hazard is presented by the phenomenon known as "kickback" which may occur when the cutting chain 22 momentarily stops and is seized by the work material. The kinetic energy of the chain normally used to remove the material is suddenly transferred to the guide bar 20 thereby imparting a force to the guide bar that causes it to kick upward toward the operator. The magnitude of the kickback force is related to the speed of the chain and the nature of engagement of the chain with the work material. Since kickback may occur in less than one-tenth of a second, serious injury can result to the operator.

According to prior art approaches, a manually operated hand guard actuator is placed in a position to be contacted by the back of the hand or wrist of the operator in the event of "kickback" and thereupon actuate a chain brake device to apply the brake and stop the cutting chain. However, it may sometimes occur that in applying a forward pressure upon the forward frame handle that an operator's hand may slip toward and into the rapidly moving cutting chain. Alternatively, the kickback reaction may be so violent that the chain saw will pivot about its center of gravity towards the operator. It will be readily appreciated that a potentially injurious situation is presented by the occurrence of either of the foregoing mentioned operational incidents. The present invention is particularly designed to minimize the injuries associated with the "kickback" phenomenon and with inadvertent or accidental movements of an operator's hands and arms relative to the cutting chain during operation.

Figure 7:
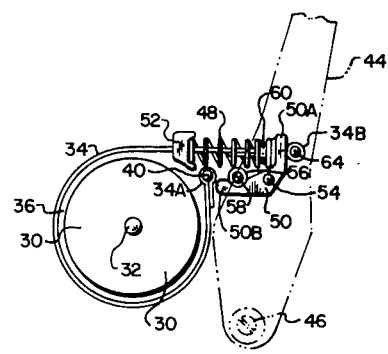
FIGS. 7 and 8 are fragmentary elevation views of the actuating mechanism shown in FIG. 1, showing the brake in the operating and braking conditions, respectively.
Figure 8:
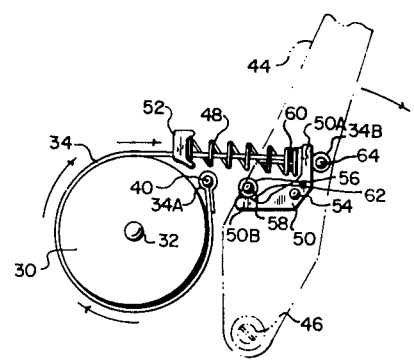

According to the invention, a hand guard actuator assembly 42 is coupled to the flexible brake band 34 for holding the brake band 34 in disengaged relation with the clutch drum 30 during normal cutting operation, and for maintaining the brake band 34 in frictional engagement with the clutch drum when it is desirable to stop the movement of the cutting chain 22. The hand guard actuator assembly includes a safety lever 44 which is pivotally mounted on a pivot pin 46 which projects from the housing 12. The safety lever 44 is initially placed in a position to be contacted by the back of the hand or wrist of an operator in the event of "kickback" and thereby actuate the chain brake assembly 28 to apply the brake and stop the cutting chain. This initial position will be referred to hereinafter as the "operating position" of the safety lever 44. The lever is shown to be in the operating position in FIGS. 1, 6 and 7 of the drawing. This is a stable operating position which requires the application of an external force acting on the safety lever 44 to cause it to rotate to the "braking" position as shown in FIG. 8 of the drawing. In the "braking" position, the flexible brake band 34 is drawn into frictional engagement with the clutch drum 30 thereby stopping movement of the cutting chain 22.

Referring again to FIG. 5 it will be seen that a shank portion 46A of the pivot pin 46 projects into a channel 47 through which the cutting chain 22 travels as it is propelled around the guide bar 20. The shank portion 46A is disposed beneath the lower loop of the cutting chain directly in the probable trajectory followed by the cutting chain should it become disengaged from the guide bar during operation. The pivot pin shank portion 46A functions as a "chain catcher" or chain guard for retarding the motion of the chain 22 in the event it should become disengaged from the guide bar which might occur when the chain becomes loose or is displaced because of kickback. Should the chain jump the guide bar 20 the chain tends to whip back toward the operator's legs or arms which can cause severe personal injury. The shank portion 46A serves to catch or intercept the chain and stop its movement or at least foreshorten the chain to keep it from striking the operator.

Figure 2:
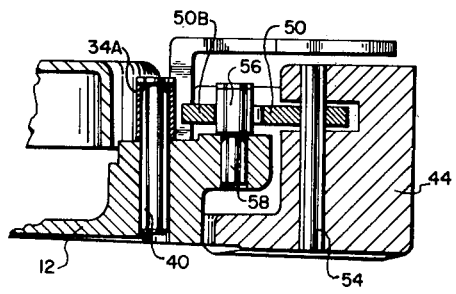
FIG. 2 is a sectional view taken along the lines II—II of FIG. 1.

The hand guard actuator assembly 42 is a bi-stable system in which the safety lever 44 is maintained indefinitely in either the operating position or in the braking position unless acted upon by an external source. The safety lever 44 is held in either of the stable positions by means of a spring member 48 and a latching member 50. In this embodiment, the spring member 48 is preferably a lineally acting coil spring which is compressively seated between a platform surface projection 52 of the housing 12 and a lever arm portion 50A of the latching member 50. According to the invention, the latching member 50 is pivotally mounted on the safety lever 44 for rotational movement relative to the safety lever. The latching member 50 is mounted on a pivot pin 54 which is anchored to the safety lever 44 and which projects orthogonally with respect to the safety lever. According to this arrangement, the spring member 48 exerts a yieldable force through the latching member 50 and pivot pin 54 to the safety lever 44 which constantly biases the safety lever for movement from the operating position to the working position. The spring member 48 also simultaneously exerts a yieldable latching force on the latching member 50 and cooperates with the safety lever for holding the detented end portion 50B of the latching member in releasable latching engagement with a portion of the housing thereby preventing inadvertent frictional engagement of the brake band 34 with the brake drum 30 when the safety lever 44 is in the operating position. The spring member 48 also cooperates with the safety lever 44 for permitting rotation and disengagement of the latching member 50 from the housing portion as the safety lever rotates from the operating position to the braking position in response to an actuating force acting on the safety lever. In a preferred embodiment, the detented end portion 50B of the latching member engages a roller 56 which is concentrically mounted on a latch pin 58 which is anchored to the housing 12 as can best be seen in FIG. 2 of the drawing.

Figure 6:
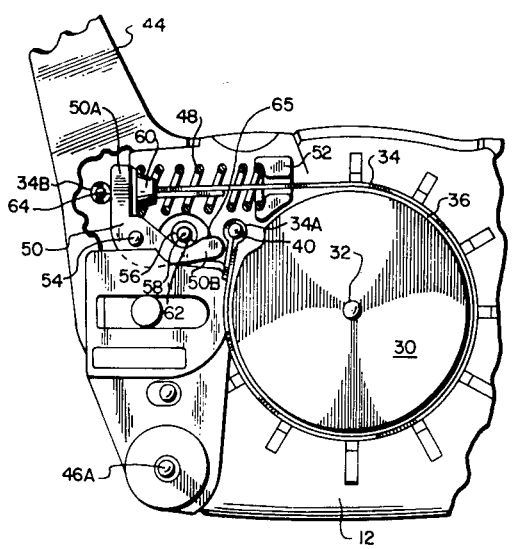
FIG. 6 is a fragmentary, sectional view of a safety braking system forming a part of the chain saw of FIG. 1, in which the braking system is in the operating (not-braking) position.

The compression spring 48 is held in place by means of the platform surface projection 52 and by means of a tang 60 which projects orthogonally with respect to the lever arm portion 50A of the latching member 50 as can best be seen in FIG. 6 of the drawing. According to this arrangement, the lever arm portion 50A of the latching member 50 is confined intermediate the compression spring 48 and the safety lever 44 so that the single spring 48 serves the dual purpose of constantly biasing the safety lever 44 towards the braking position while also holding the detented end portion 50B of the latching member 50 in releasable engagement with the roller 56, thereby preventing inadvertent release of the safety lever 44.

To permit the safety lever to be fully actuated to the braking position, the detented end portion 50B of the latching member 50 is provided with an inclined surface or ramp surface 62 which can best be seen in FIG. 6 of the drawing. In response to an external force, for example, which may be applied by movement of the hand or arm against the safety lever 44 during a violent kickback reaction, the safety lever 44 is rotated forwardly under the influence of the external applied force and under the influence of the force exerted by the spring member 48. As can be seen in FIG. 8, as the safety lever 44 rotates clockwise, the spring member 48 compresses slightly as the latching member 50 rotates counterclockwise because of the interference engagement between the detent portion 50B of the latching member and the roller 56. However, because of the ramp surface 62, and because of the differential rotation of the latching member relative to the safety lever, the detented portion 50B slips out of latching engagement on the roller 56 until the interference relation is cleared, thereby permitting the spring member 48 to fully extend and drive the safety lever 44 fully forward. The end portion 50A clears the pin 64 in the released position with spring pressure being applied to the safety lever 44 through the pivot pin 54. The magnitude of the pressure is limited by the interaction of the roller 56 with a control surface 65 of the detented end portion 50B.

Figure 3:
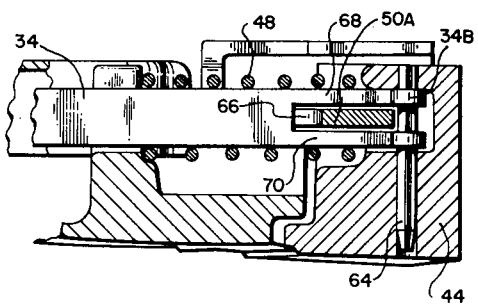
FIG. 3 is a sectional view taken along the lines III—III of FIG. 1.

The forward end 34B of the flexible brake band 34 is looped around and attached to a pin 64 which is anchored in the safety lever 44 as can best be seen in FIG. 3 of the drawing, thereby causing the brake band 34 to be pulled into frictional engagement with the clutch drum 30. Thus it will be seen that the actuating system is "bi-stable" and that by reason of the interference engagement, differential rotation and the resiliency of the actuating structure, that the lever arm 44 is retained in one or the other of its two positions, the operating position or the braking position, until a force is applied to move it to the other position. The safety lever 44 is "cocked" or returned to the operating position by manually pulling the lever 44 rearwardly toward the operator which permits the ramp surface 62 of the detent portion 50B of the latching member to ride over the roller 56 as the latching member 50 rotates about the pivot pin 54 and the spring member 48 compresses slightly. Once the roller 56 engages the detented position, the force of the spring member 48 acting through the lever arm portion 50A holds the detented portion of the latching member in releasable latching engagement with the roller 56 and latch pin 58.

Figure 4:
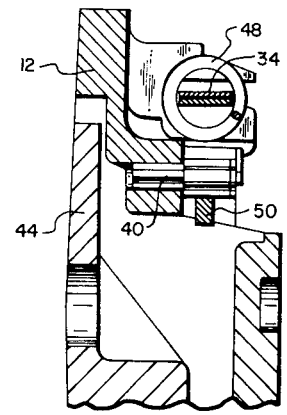
FIG. 4 is a sectional view taken along the lines IV—IV of FIG. 1.

As can best be seen in FIGS. 1, 4 and 6 of the drawing, according to a preferred arrangement, the spring member 48 is a lineally acting compression coil spring which is fitted around and encloses an end portion of the brake band 34. This arrangement is very compact and effective. According to another feature, the end of the brake band 34 is bifurcated as shown in FIG. 3 of the drawing, defining a central opening 66 for receiving the lever arm portion 50A of the latching member 50. The central opening 66 is defined by the parallel bifurcated end portion 68 and 70 of the brake band 34. In this compact arrangement, the central opening is necessary to permit relative movement of the latching member 50 as it rotates relative to the safety lever 44. When the latching mechanism becomes unlatched or is in the braking position, the ramp surface 62 (FIG. 8) rides on the latch roller 56 and engages the control surface 63 which stops latch 50 from further rotation. Therefore, the spring pressure applied transfers from spring 48 through latch 50, latch pivot pin 54, to actuating lever 44 causing it to pivot about pin 46 and tighten the brake band 34 around the drum 30.

Figures 9, 10:
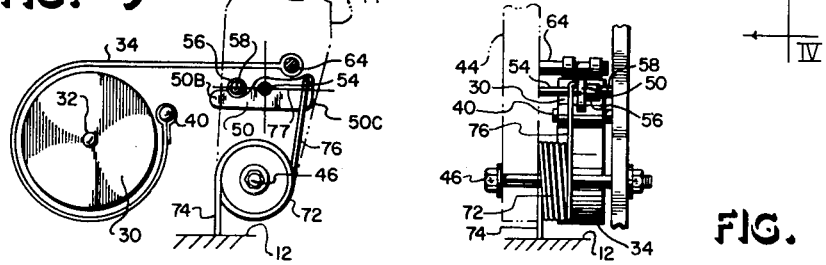
FIG. 9 is a fragmentary elevation view of an alternative embodiment in which a torsion spring is utilized; and, FIG. 10 is a side elevation view of the apparatus shown in FIG. 9.

Referring now to FIGS. 9 and 10, an alternate embodiment of the invention is illustrated in which a torsion spring 72 is employed. In this arrangement, the latching member 50 comprises a central body portion pivotally mounted on the safety lever 44 having a detented arm portion 50B and an end portion 50C defining a moment arm for transmitting the yieldable force exerted by the torsion spring through the lever arm portion of the latching member to the safety lever 44 and through the detent end portion 50B of the latching member to the roller 56. As can be seen in FIG. 9, the torsion spring includes a first end portion 74 which is anchored to the housing 12 and a second end portion 76 which is coupled to the moment arm portion 50C of the latching member. It is preferred that the second end portion 76 be coupled to the moment arm portion 50C at a point above the longitudinal centerline 77 of the pivot pin 54 to maintain a bias force on the latch and hold it in the normally latched position. The torsion spring 72 exerts a yieldable force on the latching member 50 which is translated through the moment arm portion 50C and pivot pin 54 to the safety lever 44. The same yieldable force operates to hold the detent portion 50B in releasable latching engagement with the roller 56 as previously discussed.

It will be seen that the chain brake system of the present invention represents an improvement over the prior art because of its simplicity, effectiveness and compactness. Although the chain brake system of the invention will not prevent kickback, it will drastically reduce the personal injury hazards associated with kickback. When kickback occurs, the operator's wrist or hand will pivot about the forward handle 14. The wrist or hand will strike the safety lever 44 thereby applying a force on the latching member 50. The external force applied to the safety lever 44 will be added to the yieldable force exerted by the spring member 48 to cause the safety lever 44 to rotate quickly forwardly, thereby engaging the brake band 34. Thus the spring member 48 is double acting in that it maintains the actuating mechanism in the latched or nonbraking position, and when an external force is added to the spring by striking the safety lever 44, the cam angle detent of the latching member is defeated and the spring directly applies the braking pressure. The two combined forces, that is the yieldable force of the spring member and the external force, serve to remove the actuating mechanism from the equilibrium state as the yieldable force from the spring becomes dominant, thereby forcing the safety lever forward. As the safety lever moves forward, it brings the brake band 34 into frictional engagement with the clutch drum 30. This frictional force is great enough to bring the clutch to a halt which indirectly brings the cutting chain to a halt since the clutch drives the cutter chain.

Although preferred embodiments of the invention have been described in detail, it should be understood that various changes, substitutions and alterations can be made therein without departing from the spirit and scope of the invention as defined by the appended claims.

What is claimed is:

1. In a chain saw of the type including a housing, a guide bar projecting from said housing, a cutting chain mounted to run on said guide bar in a closed loop, and motive means carried by said housing coupled to said cutting chain for propelling said cutting chain around said guide bar, the combination with said housing of a safety lever and pivot pin projecting intermediate said safety lever and said housing and supporting said safety lever for pivotal movement relative to said housing, said housing having a channel adjacent said pivot pin through which said cutting chain travels as it is propelled around said guide bar, said pivot pin including a shank portion projecting into said channel and defining a chain guard member disposed between opposite ends of said loop and beneath the lower run of said loop of said cutting chain and projecting transversely with respect to the plane of said loop through the probable trajectory followed by said cutting chain when said chain becomes disengaged from said guide bar during operation whereby said chain guard member serves to catch or intercept said cutting chain and retard its movement or at least foreshorten said cutting chain to prevent it from striking an operator of said chain saw.

2. In a chain saw of the type including a housing, a guide bar projecting from said housing, a cutting chain mounted to run on said guide bar in a closed loop, motive means carried by said housing coupled to said cutting chain for propelling said cutting chain around said guide bar, said housing including a portion forming a channel through which said cutting chain travels as it is propelled around said guide bar, and a chain guard member comprising a pin mounted on said housing portion, said pin including a shank portion projecting into said channel and disposed between opposite ends of said loop and beneath the lower run of said loop of said cutting chain and projecting transversely with respect to the plane of said loop through the probable trajectory followed by said cutting chain when said chain becomes disengaged from said guide bar during operation whereby said chain guard member serves to catch or intercept said cutting chain and retard its movement or at least foreshorten said cutting chain to prevent it from striking an operator of said chain saw.

* * * * *